US012024655B2

(12) United States Patent
Parhar

(10) Patent No.: US 12,024,655 B2
(45) Date of Patent: *Jul. 2, 2024

(54) THF-FREE PRIMERS FOR USE WITH SOLVENT CEMENTS

(71) Applicant: OATEY CO., Cleveland, OH (US)

(72) Inventor: Amrit Parhar, Westlake, OH (US)

(73) Assignee: OATEY CO., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,086

(22) Filed: May 12, 2022

(65) Prior Publication Data

US 2022/0267645 A1  Aug. 25, 2022

Related U.S. Application Data

(63) Continuation-in-part of application No. 17/101,373, filed on Nov. 23, 2020, now Pat. No. 11,351,741.

(51) Int. Cl.
*C09J 5/02* (2006.01)
*C09J 11/06* (2006.01)

(52) U.S. Cl.
CPC ............... *C09J 5/02* (2013.01); *C09J 11/06* (2013.01)

(58) Field of Classification Search
CPC ... B29C 66/026; B29C 66/71; B29C 65/4895; C09J 5/02; C09J 11/06; C09D 7/20; C09D 5/002
See application file for complete search history.

(56) References Cited

U.S. PATENT DOCUMENTS 3,765,983 A   10/1973  Putzier
11,351,741 B1 *  6/2022  Parhar ..................... C08J 7/065

2008/0029213 A1   2/2008  Scholer et al.
2010/0006220 A1   1/2010  Parhar et al.
2018/0142131 A1   5/2018  Parhar et al.
2022/0089493 A1   3/2022  Parhar et al.

OTHER PUBLICATIONS

ISA/220—Notification of Transmittal or Search Report and Written Opinion of the ISA, or the Declaration Mailed on Jan. 5, 2022 for WO Application No. PCT/US21/060275.
Outgoing—ISA/210—International Search Report Mailed on Jan. 5, 2022 for WO Application No. PCT/US21/060275.
Outgoing Written Opinion of the ISA Mailed on Jan. 5, 2022 for WO Application No. PCT/US21/060275.
Sharma et al., "Thermodynamic properties of mixtures containing linear and cyclic ketones", J. Mol. Liquids, vol. 195, Jul. 2014, pp. 132-138. (Year: 2014).
Sigma-Aldrich, Product Catalog, Cyclopentanone reagent, 2007. (Year: 2007).
International Search Report and Written Opinion issued Jan. 5, 2022 which pertains to PCT/US2021/060275 filed Nov. 22, 2021; 14 pages.
Sigma-Aldrich, Product Catalog, Cyclopentanone ReagentPlus, 2007. tps://www.sigmaaldrich.com/catalog/product/sial/c112402?lang=en®ion =US.
Sharma et al., Thermodynamic properties of mixtures containing linear and cyclic ketones, J. Mol. Liquids, vol. 195, Jul. 2014, pp. 132-138.

* cited by examiner

Primary Examiner — Christopher W Raimund
(74) Attorney, Agent, or Firm — Thompson Hine LLP

(57) ABSTRACT

Provided are THF-free primer formulations for solvent cement bonding comprising cyclopentanone and at least one additional organic solvent. The primer formulations are effective for solvent cement bonding plastic components together, wherein the plastic components may include ABS, PVC, or CPVC pipes and/or fittings.

14 Claims, No Drawings

THF-FREE PRIMERS FOR USE WITH SOLVENT CEMENTS

CROSS-REFERENCE TO RELATED APPLICATIONS

This application is a continuation-in-part of U.S. Ser. No. 17/101,373, filed Nov. 23, 2020, the entire contents of which are incorporated herein by reference.

TECHNICAL FIELD

The present disclosure relates to a primer for use with solvent cement in bonding plastic components together, and more particularly, for use in bonding plastic pipes, fittings, or other components.

BACKGROUND

Primers are used in the solvent cement process to help prepare plastic pipes, fittings, surfaces, and other articles or objects for joining components or adhesion by cleaning and softening the object to maximize adhesion once a solvent based adhesive is subsequently applied. The pipes, fittings, or other objects being adhered are typically made from PVC (polyvinyl chloride), CPVC (chlorinated polyvinyl chloride), ABS (acrylonitrile-butadiene-styrene), and other thermoplastics or polymers. Before applying a solvent cement, the surfaces to be joined are normally covered with a primer containing a solvent capable of at least partially dissolving or "softening" the surface to be bonded.

Modern environmental and health guidelines recommend or require that the content of volatile organic compounds (VOCs) in consumer products be minimized and, where possible, eliminated. Tetrahydrofuran (THF) represents a common VOC in primer formulations and solvent cements, because that compound is highly effective for dissolving thermoplastics in order to prepare them for bonding as well as for dissolving resin within the primer and solvent cement formulations. In view of the status of THF as a volatile organic compound, a need remains for primer formulations in which the concentration of THF is reduced relative to traditional adhesives, or is eliminated entirely, but that have the characteristics that are necessary for effective use in pipe joining applications.

SUMMARY

Provided herein are primer formulations for solvent cement bonding comprising cyclopentanone and at least one additional organic solvent.

DETAILED DESCRIPTION OF ILLUSTRATIVE EMBODIMENTS

The present inventions may be understood more readily by reference to the following detailed description taken in connection with the accompanying examples, which form a part of this disclosure. It is to be understood that these inventions are not limited to the specific formulations, methods, articles, or parameters described and/or shown herein, and that the terminology used herein is for the purpose of describing particular embodiments by way of example only and is not intended to be limiting of the claimed inventions.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a solvent" is a reference to one or more of such reagents and equivalents thereof known to those skilled in the art, and so forth. Furthermore, when indicating that a certain element "may be" X, Y, or Z, it is not intended by such usage to exclude in all instances other choices for the element.

Although certain existing primers are suitable for preparing a plastic surface for bonding to another plastic surface using a solvent cement, modern safety and environmental guidelines have provided an opportunity for improved primer formulations that, for example, feature a reduced concentration of volatile organic compounds (VOCs). The present inventors have discovered that primer formulations that contain the organic solvent cyclopentanone, in combination with at least one additional organic solvent, functions effectively to dissolve plastic surfaces to the degree required to prepare the surface for solvent cementing, as confirmed by testing in accordance with industry standards. These formulations provide such reduced concentrations of VOCs, among other additional benefits.

Accordingly, provided herein are primer formulations for solvent cement bonding comprising cyclopentanone and at least one additional organic solvent. In some embodiments, the primer formulations comprise about 1-70 wt % cyclopentanone, and more particularly about 1-60 wt %, 1-50 wt %, 1-44 wt %, 1-40 wt %, 1-30 wt %, or 2-25 wt % cyclopentanone. Preferably, the primer formulations comprise at least or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 5, 53, 54, 55, 56, 57, 58, 59, 60, 61, 62, 63, 64, 65, 66, 67, 68, 69, or 70 wt % cyclopentanone. Throughout the present disclosure, when an amount of a particular component of the inventive primer formulations are expressed in terms of a weight percentage, the recited amount is based on the total weight of the formulation. In certain embodiments, the cyclopentanone is present in the formulations in an amount of about 30-70 wt %, inclusive. For example, the present formulations can contain at least about 30 wt % cyclopentanone, wherein such an amount is able to dissolve at least 10% resin to satisfy ASTM standards for primer formulations.

The inventive primer formulations includes, in addition to the cyclopentanone, at least one additional organic solvent. The one or more additional solvents may be, for example, a lower alcohol, a ketone, an aldehyde, an ester, an ether, a halogenated solvent, N-methyl pyrrolidone, dimethyl-formamide, or any combination thereof. For example, the solvent may be selected from lower (e.g., $C_{1-8}$) alcohols such as methanol, ethanol and isopropanol; ketones such as acetone, methyl ethyl ketone (MEK), methyl isobutyl ketone, isophorone, or cyclohexanone (CYH); esters such as methyl acetate, ethyl acetate, ethyl formate, ethyl propionate, and butyl acetate; ethers such as methyl cellosolve (2-methoxyethanol), and dioxane; and other liquids, such as N-methyl pyrollidone, and dimethylformamide (DMF). In some embodiments, the one or more additional solvents include methyl ethyl ketone, acetone, cyclohexanone, methylene chloride, dimethylformamide (DMF), methyl isobutyl ketone (MIBK), 1,3 dioxane, methyl acetate, propyl acetate, N-methyl-2-pyrrolidone (NMP), propylene carbonate, or any combination thereof. In other embodiments, the additional organic solvent includes MEK, acetone, cyclopentanone, or any combination thereof. In some embodiments, the additional organic solvent includes cyclohexanone. In some embodiments, the additional organic solvent includes acetone. In certain embodiments, the only additional organic solvent is acetone. Preferably, the combination of cyclopentanone and the additional organic solvent is able to dissolve at least 10% resin in order to satisfy ASTM standards for primer formulations.

In some embodiments in which the additional organic solvent includes cyclohexanone, the amount of cyclopentanone can be from about 1 to 50 wt %, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 wt %. In such embodiments, the amount of cyclohexanone can be from about 20-50 wt %, such as about 20, 21, 22, 23, 24, 25, 26 27, 28, 29 30, 31, 32, 33, 34, 35, 36, 37, 38, 39, 40, 41, 42, 43, 44, 45, 46, 47, 48, 49 or 50 wt %.

The primer formulation is THF-free, by which it is meant that no THF is intentionally included in the formulation, but that there may be up to about 5 wt % of THF due to contamination during manufacture of the primer or its constituent ingredients. In some embodiments, a THF-free primer formulation contains up to about 0.5, 1, 2, 3, 4, or 5 wt % of THF, for example, due to contamination. The presently disclosed primer formulations are THF-free, such that they can substantially address possible regulatory and safety concerns. The present CYP-based formulations that are THF-free have been found to be surprisingly effective for softening the surfaces of thermoplastic components in preparation for a bonding procedure, particularly in the sense that they compare favorably both to primer formulations that include THF and to primer formulations that represent other alternatives to THF. For example, the present primer formulations provide high lap shear strengths at 2, 16, and 72 hours after application and high hydrostatic burst strengths, as compared with other solvent alternatives to THF.

The additional or second solvent or combination of solvents added to cyclopentanone in the primer formulations may be selected based upon the type of plastic surface (e.g., thermoplastic polymer) to which the primer will be applied. For example, a primer formulation intended to be used for solvent cementing PVC components can include cyclopentanone in combination with cyclohexanone. It should be understood by one having ordinary skill in the art that other solvents can also be used in addition to cyclopentanone for use in solvent cementing PVC components. The solvent or combination of solvents should be capable of dissolving or softening a surface of a thermoplastic polymer or combination of polymers that is preferably the same as the thermoplastic polymer or polymers that are included in the solvent cement formulation for which the primer prepares the plastic surface.

In certain embodiments, the one or more additional organic solvents include acetone, methyl ethyl ketone, cyclohexanone, or any combination thereof. For example, the primer formulations may include, in addition to cyclopentanone, zero to about 55% by weight of methyl ethyl ketone, zero to about 55% by weight cyclohexanone, zero to about 55% by weight of acetone, zero to about 55% by weight, or any combination thereof. The primer formulations may include, for example, about 30-50% by weight cyclopentanone, and up to about 55% by weight of methyl ethyl ketone, up to about 55% by weight cyclohexanone, up to about 55% by weight of acetone, up to about 55% by weight THF, or any combination thereof.

In exemplary embodiments, the primer formulations are capable of dissolving at least 10% by weight of polyvinyl chloride (PVC) resin within 60 minutes, in accordance with the requirements of ASTM F656.

In an exemplary embodiment, the present primers further include a colorant, which can include, without limitation, any colorant known to be used or typically found in tinted primers.

In certain embodiments, the present primer formulations do not contain a polymer. Polymers have been added to previous primer formulations in order to increase their viscosity. However, the present formulations preferably avoid the use of a polymer. It has been surprisingly discovered by the present inventors that the use of polymer-containing primer formulations can result in reduced joint strengths, especially when there is a temporal delay between application of the primer formulation and application of the solvent cement. For example, the present inventors have discovered that if at least or about 3, 4, 5, 6, 7, 8, 9, 10, 11, 12, 13, 14, or 15 minutes elapse from the time a polymer-containing primer formulation is applied to a surface to be bonded to the time when a solvent cement is applied to the surface, a reduction in joint strength can result, relative to the joint strength that would result from a situation in which a primer formulation that does not include a polymer is applied to the surface. The presently disclosed primer formulations that are polymer-free can therefore enable higher joint strengths than prior art primer formulations that contain a polymer.

In certain embodiments, the primer is housed within a package. Such a package includes, for example, a tube, a canister, or a brush bottle.

The primer formulation in the primer/solvent cement systems may be in accordance with any of the embodiments described in the present disclosure.

Conventional solvent cements, and indeed a solvent cement of the present systems, contains a thermoplastic resin dissolved in an organic solvent. In the primer/solvent cement system, the solvent cement may comprise, for example, dissolved PVC, CPVC, ABS, or any combination thereof. The organic solvent or combination of organic solvents may be selected from any of the organic solvents described elsewhere in the present disclosure for use in the inventive primer formulations. In some embodiments, all or some of the solvents in the solvent cement may be the same as the solvent or solvents in the primer system.

In some embodiments, the solvent cement may be any of the embodiments described in U.S. Ser. No. 17/029,614, filed on Sep. 23, 2020.

The following examples illustrate an exemplary embodiment and features encompassed by the general inventive concepts. The examples are given solely for the purpose of illustration and are not to be construed as limiting the present disclosure, as many variations thereof are possible and also encompassed by the general inventive concepts.

EXAMPLE 1

An exemplary primer formulation contains 45 wt % cyclopentanone and 55 wt % acetone A trace amount of a purple colorant is added.

EXAMPLE 2

Another exemplary primer formulation contains 40 wt % cyclopentanone, 40 wt % acetone, and 20 wt % MEK.

EXAMPLE 3

Primer formulations were prepared that contain cyclopentanone and cyclohexanone, as provided below in Table 1:

| Formulation | CYP | CYH | MEK | ACE |
|---|---|---|---|---|
| A | 20 | 30 | 5 | 45 |
| B | 10 | 40 | 5 | 45 |

EXAMPLE 4

A primer formulation containing 50 wt % cyclopentanone and 50 wt % acetone was prepared, and experiments were conducted in order to assess the lap shear strength and hydrostatic burst strength that results from the use of the primer formulation to bond two plastic components. The experimental results were compared to those that were obtained from the use of other solvent alternatives to THF, and, in the case of the lap shear strength experiments, of THF itself as the sole solvent.

Tables 1 and 2, below, provide the results of testing for lap shear strength and hydrostatic burst strength, respectively.

TABLE 1

| Lap Shear Strength (psi) | | | | | | |
|---|---|---|---|---|---|---|
| | THF | ACE | MEK | CYH | CYP | CYH:ACE (50:50) | CYP:ACE (50:50) |
| 2 hr | 495 | 272 | 391 | 87 | 233 | 391 | 460 |
| 16 hr | 764 | 245 | 493 | 289 | 494 | 660 | 821 |
| 72 hr | 1429 | 76 | 823 | 298 | 675 | 891 | 1022 |

TABLE 2

| 2 hr Hydrostatic Burst Strength (psi) | | | | | | |
|---|---|---|---|---|---|---|
| ACE | MEK | THF | CYH | CYP | CYH:ACE (50:50) | CYP:ACE (50:50) |
| 209 | 540 | N/T | 239 | 302 | 349 | 418 |

N/T = not tested

The preceding results demonstrate that the inventive primer formulations produce better results than other tested primers and primer combinations representing alternatives to THF, and thereby represent a viable substitute for THF. For example, as compared with other alternatives to THF, the claimed primer combination of cyclopentanone and acetone produced the highest lap shear strength at 2, 16, and 72 hours after application. This combination also performed more favorably than the combination of cyclohexanone and acetone, indicating that cyclohexanone and cyclopentanone were not functionally equivalent in this context. The experiments also demonstrated that the inventive formulations produce beneficial hydrostatic burst strength compared with other alternatives to THF. The specific primer combination of cyclopentanone and acetone therefore represents a surprisingly effective alternative to THF.

What is claimed:

1. A THF-free primer formulation for use with solvent cements, wherein the primer formulation comprises:
    at least 30% cyclopentanone based on the total weight of the formulation; and
    more than 50% acetone based on the total weight of the formulation,
    wherein the primer formulation does not include a polymer and is configured to bond components having resin-based surfaces and is capable of dissolving at least 10% of the resin-based surfaces.

2. The THF-free primer formulation according to claim 1, further comprising a colorant.

3. The THF-free primer formulation according to claim 1, comprising 30-45 wt % cyclopentanone.

4. The THF-free primer formulation according to claim 1, wherein the cyclopentanone is present in an amount of at least 45 wt % based on the total weight of the formulation.

5. The THF-free primer formulation according to claim 1, wherein the formulation further comprises at least one additional organic solvent selected from the group consisting of methyl ethyl ketone, cyclohexanone, N-methyl-2-pyrrolidone, and mixtures thereof.

6. A primer/solvent cement kit comprising:
    a THF-free primer formulation according to claim 1; and
    a solvent cement formulation comprising a thermoplastic resin dissolved in an organic solvent.

7. A THF-free primer formulation for use with solvent cements, wherein the primer formulation comprises:
    at least 30% cyclopentanone based on the total weight of the formulation; and
    more than 50% of one or more additional organic solvents based on the total weight of the formulation;
    wherein the primer formulation does not include a polymer and is configured to bond components having resin-based surfaces and is capable of dissolving at least 10% of the resin-based surfaces.

8. The THF-free primer formulation according to claim 7, further comprising a colorant.

9. The THF-free primer formulation according to claim 7, comprising about 30%-45 wt % cyclopentanone.

10. The THF-free primer formulation according to claim 7, wherein the cyclopentanone is present in an amount of about 45 wt % based on the total weight of the formulation.

11. The THF-free primer formulation according to claim 7, wherein the one or more additional organic solvents comprises acetone.

12. The THF-free primer formulation according to claim 7, wherein the one or more additional organic solvents consist of acetone.

13. A primer/solvent cement kit comprising:
    a THF-free primer formulation according to claim 7; and
    a solvent cement formulation comprising a thermoplastic resin dissolved in an organic solvent.

14. The primer/solvent cement kit according to claim 13, wherein some or all of the solvents in the solvent cement are the same as organic solvents in the primer formulation.

* * * * *